United States Patent [19]

Kikutani

[11] Patent Number: 5,540,208
[45] Date of Patent: Jul. 30, 1996

[54] LIQUEFIED GAS FUEL SUPPLY SYSTEM

[75] Inventor: Isao Kikutani, Nishi-ku, Japan

[73] Assignee: Nabco Limited, Kobe, Japan

[21] Appl. No.: 527,366

[22] Filed: Sep. 12, 1995

[30] Foreign Application Priority Data

Sep. 13, 1994 [JP] Japan .................................. 6-219163
Sep. 13, 1994 [JP] Japan .................................. 6-219164

[51] Int. Cl.⁶ ............................. F02M 33/02; F02B 43/00
[52] U.S. Cl. ........................... 123/518; 123/529; 62/48.2;
  62/48.4; 62/323.1
[58] Field of Search .................... 123/527, 529,
  123/3, DIG. 12, 518; 62/48.1, 48.2, 48.4,
  50.2, 323.1

[56] References Cited

U.S. PATENT DOCUMENTS

| | | | |
|---|---|---|---|
| 3,842,613 | 10/1974 | Becker | 62/50 |
| 3,857,245 | 12/1974 | Jones | 62/50 |
| 4,068,639 | 1/1978 | Cook | 123/529 |
| 4,675,037 | 6/1987 | Newton | 62/28 |
| 4,727,723 | 3/1988 | Durr | 62/54 |
| 4,851,020 | 7/1989 | Montgomery, IV | 62/48.1 |
| 5,375,580 | 12/1994 | Stolz et al. | 123/527 |

FOREIGN PATENT DOCUMENTS

| | | | |
|---|---|---|---|
| 52-39278 | 3/1977 | Japan | 62/48.1 |
| 75152 | 5/1982 | Japan . | |
| 174745 | 11/1982 | Japan . | |
| 61-10200 | 1/1986 | Japan | 62/48.1 |
| 149756 | 6/1990 | Japan . | |
| 244700 | 9/1992 | Japan . | |
| 325757 | 11/1992 | Japan . | |
| 178102 | 7/1993 | Japan . | |

*Primary Examiner*—Erick R. Solis
*Attorney, Agent, or Firm*—Schnader Harrison Segal & Lewis

[57] ABSTRACT

A system for vaporizing liquefied gas fuel supplied from a fuel tank and supplying it to an internal combustion engine includes a release path for releasing spontaneously evaporated fuel gas in said tank out of the tank. A catalytic burner is disposed in the release path for decomposing the fuel gas into hot steam and carbon dioxide. A release control valve disposed between the catalytic burner and the fuel tank selectively causes the burner and the fuel tank to communicate and to be decoupled from each other.

13 Claims, 4 Drawing Sheets

LIQUEFIED GAS FUEL SUPPLY SYSTEM

The present invention relates to a liquefied gas fuel supply system for supplying a liquefied gas fuel, such as liquefied natural gas, to, for example, an internal combustion engine mounted on a car.

BACKGROUND OF THE INVENTION

Some internal combustion engines use a liquefied gas fuel. Such liquefied gas fuel is bottled in a fuel tank, and is vaporized by a vaporizer before it is supplied to the engine. Since the boiling point of liquefied gas fuel is very low, it is readily evaporated. Evaporation of liquefied gas in the fuel tank increases the pressure within the tank. Therefore, the pressure within the tank tends to exceed the pressure the fuel tank can withstand. In such a ease, the evaporated fuel in the fuel tank is transferred to an occlusion tank. If the pressure within the occlusion tank tends to exceed the pressure the occlusion tank can withstands, the evaporated fuel may sometimes released into atmosphere.

If the liquefied gas internal combustion engine of a ear is not operated for a long time, the amount of gas resulting from the evaporation of the liquefied fuel may increase, which may result in release of a larger amount of evaporated fuel into atmosphere.

Japanese Unexamined Patent Publication (KOKAI) No. HEI 4-325757 proposes a system in which occlusion tanks are installed at predetermined sites, and ears are parked at the occlusion tanks, where evaporated fuel in fuel tanks of the ears are transferred to the occlusion tanks. The gas occluded in the occlusion tanks may be supplied to, for example, home-use gas appliances to thereby efficiently utilize evaporated fuel.

The system disclosed in the Japanese publication, however, requires piping for transferring the evaporated fuel in the fuel tank to the occlusion tank. Furthermore, such piping must be connected to a car to transfer the evaporated fuel from the car fuel tank to the occlusion tank, and, then, disconnected from the car when the car is driven to run, which is very troublesome. If the car cannot be parked at occlusion tank sites, evaporated fuel must be released into atmosphere, which inevitably causes air pollution.

Now, the present invention is described hereinafter. Throughout the specification, a term "evaporated (gas) fuel" or the like is used to denote naturally evaporated gas fuel, such as fuel evaporated in a fuel tank, whereas a term "vaporized fuel" is used to denote gas fuel positively vaporized in a vaporizer for supply to an internal combustion engine.

SUMMARY OF THE INVENTION

According to one aspect of the present invention, a liquefied gas fuel supply system includes a fuel tank which contains liquefied gas fuel, and fuel supplying means for vaporizing the liquefied gas fuel and supplying it to an internal combustion engine. The system further includes a releasing path for releasing from the tank evaporated gas resulting from the evaporation of the liquefied gas fuel within the fuel tank, decomposing means disposed in the releasing path for chemically decomposing the evaporated gas, and release control means disposed in said releasing path between the decomposing means and the fuel tank. The release control means selectively assumes a coupling state for mocking the decomposing means communicate with the fuel tank, and a decoupling state for decoupling the decomposing means from the fuel tank.

The liquefied gas fuel supply system may further include switch means disposed between the release control means and the fuel tank and switchable between a first coupling state for making the release control means communicate with the fuel tank, and a decoupling state for decoupling the release control means from the fuel tank. The switch means assumes the first coupling state when the pressure within the fuel tank reaches a value set near the pressure that the fuel tank can withstand. The system may further include a buffer tank disposed between the switch means and the release control means. The system may further include supply control means disposed between the buffer tank and the fuel supplying means and switchable between a coupling state for making the buffer tank communicate with the fuel supplying means, and decoupling means for decoupling the buffer tank from the fuel supplying means. The supply control means assumes the coupling state when the internal combustion engine is operating and evaporated fuel gas is present in the buffer tank.

The release control means may be placed in the coupling state when the pressure of evaporated fuel in the buffer tank reaches a value set near the pressure the buffer tank can withstand.

The switch means may be arranged to be selectively switched also to a second coupling state in which the fuel tank is coupled to the fuel supplying means. The switch means is switched into the second coupling state when the pressure within the fuel tank exceeds a predetermined pressure related to the maximum bottling pressure.

The fuel supplying means may include a surge tank, and may also include another coupling means disposed between the outlet of the surge tank and the buffer tank for making the surge tank communicate with the buffer tank when the pressure within the surge tank reaches a value set near the pressure which the surge tank can withstand.

The decomposing means may include a catalyst layer for decomposing the evaporated fuel into carbon dioxide and water. The decomposing means may include means for producing hydrogen from the evaporated fuel and supplying the produced hydrogen as a fuel to a fuel cell.

The liquefied gas fuel supply system may further include pressure adjusting means disposed between the release control means and the fuel tank for supplying the evaporated fuel from the fuel tank to the release control means when the pressure within the fuel tank reaches a value near the pressure which the fuel tank can withstand, a buffer tank disposed between the pressure adjusting means and the release control means, and re-liquefying means disposed between the buffer tank and the fuel tank for re-liquefying the evaporated fuel within the buffer tank back into a liquefied gas fuel and supplying the re-liquefied gas fuel to the fuel tank.

The liquefied gas fuel supply system may include supply control means which is disposed between the buffer tank and the reliquefying means and arranged to be switchable between a coupling state and a decoupling state. The supply control means is placed in the coupling state when evaporated fuel is present within the buffer tank.

The fuel supplying means may include a surge tank, and also coupling means disposed between the outlet of the surge tank and the buffer tank for making the surge tank communicate with the buffer tank when the pressure within the surge tank reaches a value set near the pressure which the surge tank can withstand.

According to another aspect of the present invention, a liquefied gas fuel supply system includes a fuel tank storing a liquefied gas fuel, fuel supplying means for vaporizing the liquefied gas fuel and supplying the vaporized gas fuel to an internal combustion engine, decomposing means for chemically decomposing evaporated gas fuel evaporated from the liquefied fuel within the fuel tank, and switch means switchable between a first state for coupling the evaporated gas with the decomposing means and a second state for supplying the evaporated gas fuel to the fuel supplying means. The switch means is switched to the second state when the pressure in the fuel tank exceeds a first pressure related to the maximum bottling pressure, and is switched to the first state when the pressure within the fuel tank reaches a value which is greater than the first pressure and is related to the pressure the fuel tank can withstand.

The liquefied gas fuel supply system may include a surge tank in the fuel supplying means, and also a pressure adjusting valve disposed between the surge tank and the decomposing means. The pressure adjusting valve couples the gaseous fuel in the surge tank to the decomposing means when the pressure of the gaseous fuel in the surge tank exceeds a value related to the pressure which the surge tank can withstand.

According to still another aspect of the invention, a liquefied gas fuel supply system includes a fuel tank containing a liquefied gas fuel, fuel supplying means for vaporizing and supplying the liquefied gas fuel to an internal combustion engine, a buffer tank, a pressure adjusting valve for transferring gas fuel evaporated in the fuel tank to the buffer tank when the pressure within the fuel tank exceeds a value related to the pressure the fuel tank can withstand, and re-liquefying means disposed between the buffer tank and the fuel tank for re-liquefying the fuel gas within the buffer tank and supplying the re-liquefied gas fuel to the fuel tank.

The liquefied gas fuel supply system may further include a surge tank in the fuel supplying means, and a pressure adjusting valve disposed between the surge tank and the buffer tank for transferring evaporated gas fuel within the surge tank to the buffer tank when the pressure within the surge tank exceeds a value related to the pressure that the surge tank can withstand.

Now, the present invention is described with reference to the accompanying drawings.

DETAILED DESCRIPTION OF THE PREFERRED EMBODIMENTS

Figure 1:
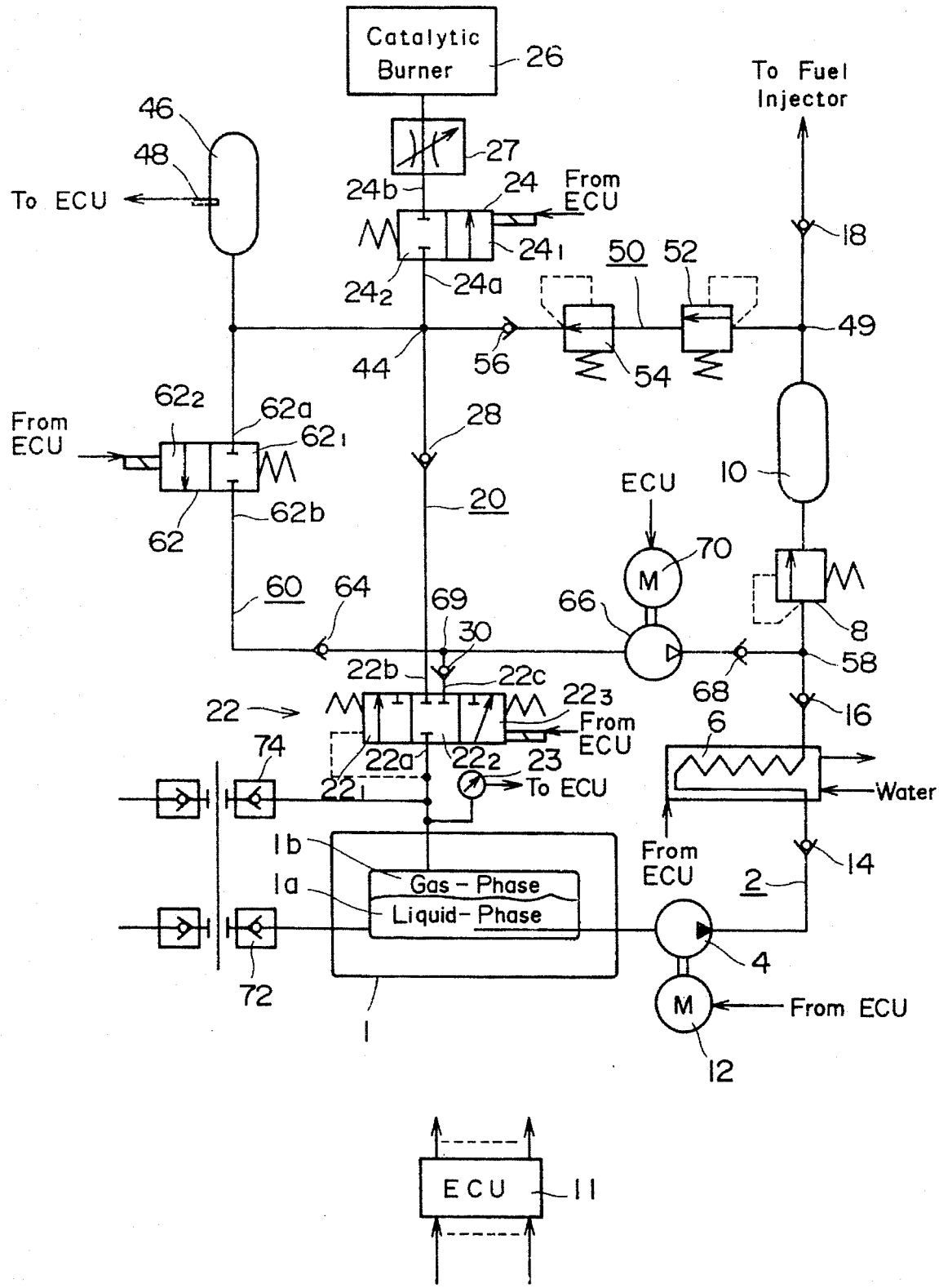
FIG. 1 is a circuit diagram showing a liquefied gas fuel supply system according to a first embodiment of the present invention.

A liquefied gas fuel supply system according to a first embodiment of the present invention is now described with reference to FIGS. 1 and 2. The illustrated liquefied gas fuel supply system is used to supply liquefied gas fuel to an internal combustion engine of an automobile. As shown in FIG. 1, the liquefied gas fuel supply system includes a double-walled fuel tank which contains liquid-phase gas fuel, for example, liquefied natural gas $1a$. The liquefied gas fuel $1a$ is vaporized by fuel supply means, for example, a fuel supply path, 2 and, then, supplied to a fuel injector (not shown) of an internal combustion engine (not shown). The fuel tank 1 has a withstanding pressure (i.e. an internal pressure that the tank 1 can withstand) of, for example, 2.56 MPa, and the gas fuel is bottled to a maximum bottling pressure of 1.43 MPa.

The fuel supplying path 2 includes in the named serial order from the fuel tank 1 to the fuel injector, a pump 4, a vaporizer 6, a pressure adjusting valve, for example, a relief valve 8, and a surge tank 10. The pump 4 is driven by a motor 12 which is controlled by control means, for example, an electronic control unit (ECU) 11, to suck the liquid-phase gas fuel $1a$ in the fuel tank 1 and supply it to the vaporizer 6. The vaporizer 6 vaporizes the supplied liquid-phase gas fuel $1a$ by means of heat exchange, using water, for example, as a heat transfer medium. The relief valve 8 blocks vaporized gas until the pressure of the vaporized gas, i.e. the pressure at the inlet port of the relief valve 8 reaches the value, for example, 25.6 MPa, which is suitable for use as the fuel for the internal combustion engine. Once the pressure of the vaporized gas reaches or exceeds this value, the pressure functions as a pilot pressure to conduct the vaporized gas fuel therethrough. When the pressure decreases below this value, namely, 25.6 MPa, the valve 8 returns to the state to block the vaporized gas fuel.

In the inlet port side of the vaporizer 6 in the fuel supplying path 2, a check valve 14 is disposed, which prevents vaporized gas fuel from flowing in the reverse direction from the inlet port of the vaporizer to the pump 4. Another check valve 16 is disposed in the outlet port side of the vaporizer 6, which prevents vaporized gas fuel from flowing from the relief valve 8 back to the vaporizer 6. A check valve 18 disposed in the outlet side of the surge tank 10 prevents vaporized gas fuel from flowing from the fuel injector back to the surge tank 10. The surge tank 10 can withstand a pressure of, for example, 30.6 MPa.

Within the tank 1, the liquefied gas fuel may be evaporated spontaneously. A release path 20 is connected to the upper portion of the fuel tank 1 to release excess evaporated gas fuel $1b$ produced or evaporated in the fuel tank 1. The release path 20 includes, in the named order from the fuel tank 1, switch means, for example, a solenoid valve 22, release control means, for example, a release control solenoid valve 24, flow rate adjusting means, for example, a pressure-corrected flow rate control valve 27, and chemically decomposing means, for example, a catalytic burner 26.

The solenoid valve 22 has a first port $22a$, a second port $22b$, and a third port $22c$, with the first port $22a$ coupled to the fuel tank, with the second port $22b$ coupled via a check valve 28 to the release control valve 24. A check valve 30 is coupled to the third port $22c$.

The solenoid valve 22 can assume a first position $22_1$, a second position $22_2$, and a third position $22_3$. In the first position $22_1$ of the solenoid valve $22a$ the valve 22 is in a first coupling state in which the first port $22a$ communicates with the second port $22b$ and the third port $22c$ is closed. In the second position $22_2$, the valve 22 is decoupling state in which all of the first, second and third ports are closed, that is, the fuel tank 1 is decoupled from both of the release control valve 24 and the check valve 30. In the third position $22_3$, the first port $22a$ is in communication with the third port 22c and the second port 22b is closed so that the valve 22 is in a second coupling state in which the fuel tank 1 and the check valve 30 are brought into communication.

A pressure gauge 23 is used to measure the pressure within the fuel tank 1. When the pressure gauge 23 detects that the pressure within the fuel tank 1 reaches a predetermined value, e.g. 1.6 MPa, slightly greater than the maximum bottling pressure of 1.43 MPa of the fuel tank 1, and, at the same time, the ECU 11 determines that the internal combustion engine is operating, the ECU 11 generates a control signal in response to which the solenoid coil of the solenoid valve 22 is excited to place the valve 22 in the third position $22_3$.

When the pressure within the fuel tank 1 exceeds the fuel tank safety pressure, e.g. 1.84 MPa, which is determined to be slightly lower than the withstanding pressure of 2.56 MPa of the fuel tank 1, the pressure reached by the tank I functions as a pilot pressure to cause the solenoid valve 22 to assume the first switch position $22_1$.

The valve 22 assumes the second position $22_2$ when the pressure within the tank 1 is less than 1.6 MPa.

The release control valve 24 has a first port 24a and a second port 24b, with the first port 24a coupled via the check valve 28 to the second port 22b of the solenoid valve 22. As shown in detail in FIG. 2, the second port 24b of the release control valve 24 is coupled via a pressure-corrected flow rate control valve 27 to a combustion catalyst layer 34, described in detail later, of the catalytic burner 26.

The release control valve 24 is switchable between a first position $24_1$ in which the first port 24a is coupled to, i.e. in communication with the second port 24b, and a second position $24_2$ in which both the first and second ports 24a and 24b are closed or decoupled from each other. When no control signal is applied to the release control valve 24 from the ECU 11, the valve 24 is in the second position $24_2$, and when a control signal is applied from the ECU 11 to the valve 24, it assumes the first position $24_1$.

Figure 2:
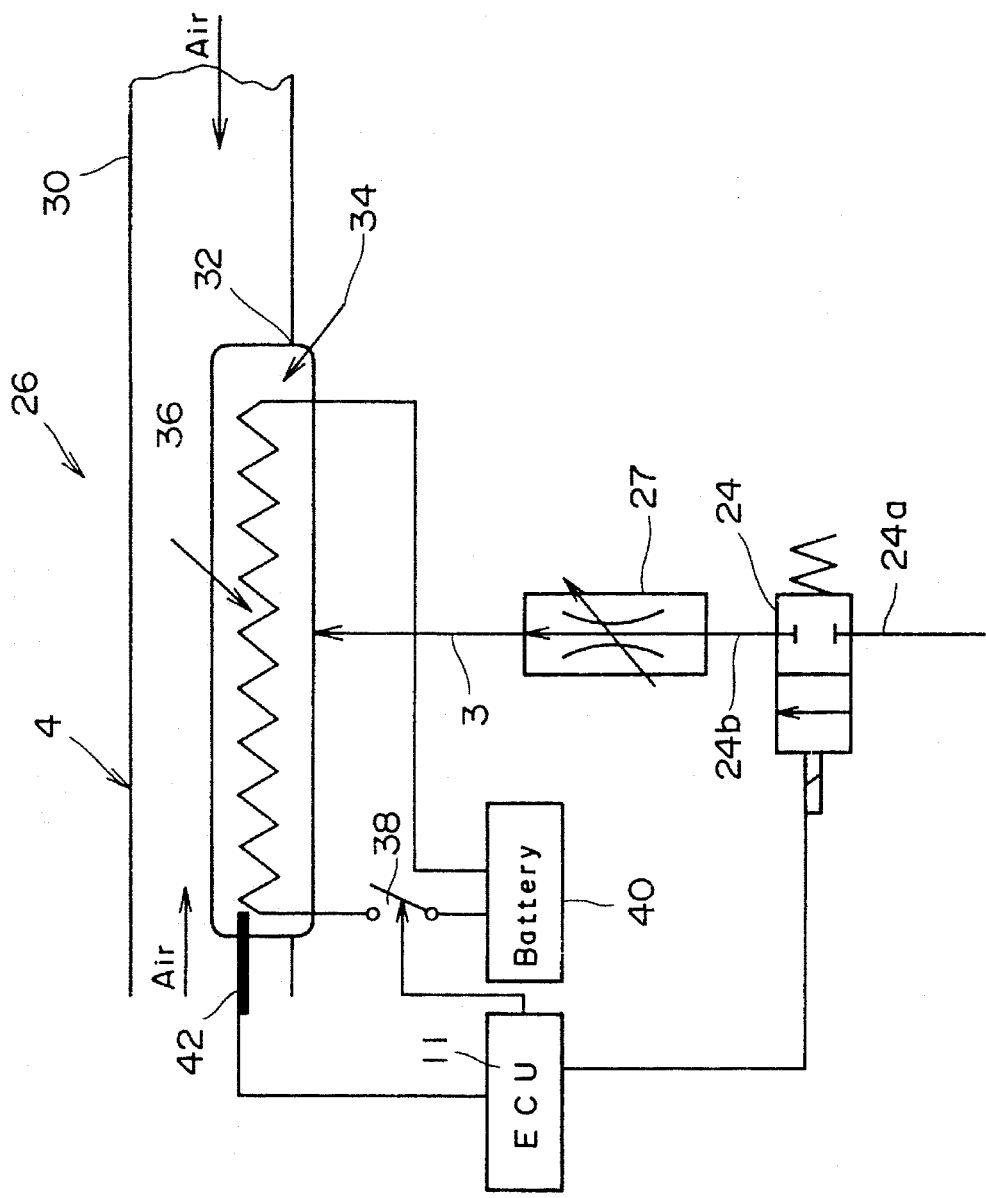
FIG. 2 illustrates the structure of a catalytic burner for use in the first embodiment.

As shown in FIG. 2, the catalytic burner 26 includes a reaction chamber 30 into which air is introduced from both sides thereof. An opening 32 is formed in one portion of the chamber 30. A combustion catalyst layer 34 is placed in the opening 32. The combustion catalyst layer 34 includes a catalyst of, for example, iron or nickel, and has a number of throughholes (not shown) therein which the excess evaporated gas fuel 1b can pass through. A heater wire 36 is embedded in the catalyst layer 34. The heater 36 is connected to a battery 40 through a switch 38 of which the operation is controlled by the ECU 11.

A temperature sensor 42 senses the temperature of the combustion catalyst layer 34 and inputs the sensed temperature to the ECU 11. When the sensed temperature is a temperature suitable for catalytic reaction in the combustion catalyst layer 34, the ECU 11 causes the release control valve 24 in its first position $24_1$.

The battery 40 maybe a battery for the combustion engine of the automobile.

As shown in FIG. 1, the release path 20 is branched at a branching point 44 between the release control valve 24 and the check valve 28 to a buffer tank 46 which has a withstanding pressure of, for example, 2.56 MPa, i.e. the tank 46 can withstand a pressure of 2.56 MPa.

When the solenoid valve 22 is switched into the first position $22_1$, the evaporated gas fuel 1b evaporated in the fuel tank 1 is fed to the buffer tank 46 through the solenoid valve 22 and the point 44. A pressure gauge 48 is associated with the buffer tank 46, which monitors the pressure within the buffer tank 46 and inputs the sensed pressure to the ECU 11. When the sensed pressure is at the safety pressure of the buffer tank 46, for example, 2.3 MPa which is slightly lower than the withstanding pressure of the buffer tank 46, the ECU 11 closes the switch 38 to supply electric power to the heater 36.

A branching point 49 between the outlet of the surge tank 10 and the check valve 18 is coupled to the branching point 44 by a communication path 50. The communication path 50 may include, in the named order from the point 49, for example, a relief valve 52, pressure adjusting means, for example, a pressure reducing valve 54, and a check valve 56. The relief valve 52 operates to introduce the fuel gas within the surge tank 10 to the branching point 44 when the pressure in the primary side of the relief valve 52, i.e. the pressure at the branching point 49 reaches a value, for example, 26 MPa, which is slightly lower than the withstanding pressure of 30.6 MPa of the surge tank 10.

The pressure reducing valve 54 operates to reduce the pressure of the fuel gas from the relief valve 52 to a value, for example, 1.8 MPa, which is suitable for burning in the catalytic burner 26 and also for storage in the buffer tank 46. The check valve 56 prevents the fuel gas from flowing from the buffer tank 46 and the release control valve 24 back to the pressure reducing valve 54.

An excess fuel gas supply path 60 extends from a branching point 58 between the relief valve 8 and the check valve 16 to the buffer tank 46. The excess fuel gas supply path 60 includes, in the name order from the buffer tank 46, supply control means, for example, a supply control solenoid valve 62, a check valve 64, compressing means, for example, a compressor 66, and a check valve 68.

The supply control solenoid valve 62 has a first port 62a coupled to the buffer tank 46, and a second port 62b coupled to the check valve 64. The supply control solenoid valve 62 is switchable between a first position $62_2$ in which both the first and second ports 62a and 62b are closed, and a second position $62_2$ in which the first and second ports 62a and 62b are coupled or in communication with each other. When no control signal is applied from the ECU 11 to the solenoid of the supply control solenoid valve 62, the valve 62 assumes the first position $62_1$, and assumes the second position $62_2$ when a control signal is applied to it from the ECU 11. If the pressure gauge 48 associated with the buffer tank 46 indicates a pressure within the buffer tank 46 which is lower than a pressure produced by the presence of gas within the buffer tank 46, for example, 0.12 MPa or about the atmospheric pressure, that is, if little fuel gas is present in the buffer tank 46, no control signal is applied from the ECU 11 to the solenoid of the supply control solenoid valve 62 so that the valve 62 assumes the first position $62_1$. On the other hand, if the pressure within the buffer tank 46 is above 0.12 MPa, i.e. if fuel gas is present in the buffer tank 46, a control signal is supplied from the ECU 11 to the solenoid of the valve 62 to place the valve 62 in the second position $62_2$.

The junction 69 between the check valve 64 and the compressor 66 is coupled in communication with the third port 22c of the solenoid valve 22. When the solenoid valve 22 is in the third position $22_3$, the fuel gas resulting from spontaneous evaporation of the fuel within the fuel tank 1 coupled to the third port 22c is supplied to the compressor 66. When the supply control solenoid valve 62 is in its second position $62_2$, fuel gas is supplied from the buffer tank 46 to the compressor 66 via the valve 62.

The compressor 66 is driven by a motor 70 which is, in turn, controlled by a control signal supplied from the ECU 11. The compressor 66 compresses the fuel gas supplied via the junction 69 thereto to increase the pressure of the gas to, for example, 25.7 MPa so that the fuel gas can be used as the fuel for the internal combustion engine. The check valve 68 prevents fuel gas from flowing from the point 58 back to the compressor 66.

A fuel replenishing port 72 is disposed in a lower portion of the fuel tank 1 for replenishing the tank 1 with liquefied gas fuel $1a$. A removal port 74 is disposed in the path 20 at a location between the first port $22a$ of the solenoid valve 22 and the top of the fuel tank 1 to remove excess fuel gas $1b$ within the tank 1 while liquefied gas fuel $1a$ is being supplied to the fuel tank 1.

The liquefied gas fuel supply system described above operates in the following manner. First, let it be assumed, for example, that the solenoid valve 22 is in the second position $22_2$, the release control solenoid valve 24 is in the second position $24_2$, and the supply control solenoid valve 62 is in its first position $62_1$, so that the respective valves 22, 24 and 62 are in the decoupling state. Further let is be assumed that the pump 4 is sucking liquefied gas fuel $1a$, the vaporizer 6 is vaporizing the sucked liquefied gas fuel and supplying the vaporized fuel gas to the fuel injector via the relief valve 8 and the surge tank 10. Under the condition described, when the pressure of gas $1b$ evaporated within the fuel tank 1 exceeds 1.6 MPa, which is detected by the pressure gauge 23, the ECU 11 causes the solenoid valve 22 to assume the third position $23_3$. As a result, the evaporated gas $1b$ flows into the excess fuel gas supply path 60, compressed in the compressor 66, and is supplied through the point 58 and the fuel supply path 2 to the fuel injector. Thus, the gas $1b$ resulting from spontaneous evaporation of the fuel within the fuel tank 1 can be efficiently utilized as the fuel, without releasing it into air.

If the pressure within the surge tank 10 exceeds the safety pressure of the surge tank 10 because, for example, the internal combustion engine is driven at a relatively low rotation rate so that the amount of fuel consumed decreases, the relief valve 52 operates to release the gas from the surge tank 10, and the released gas is pressure-reduced in the pressure reducing valve 54 and flows into the buffer tank 46 via the check valve 56 and the branching point 44. This prevents the surge tank 10 from being broken, and, furthermore, no fuel gas within the surge tank 10 need be released into air.

If the internal combustion engine is not operated for a long time, the pressure of gas $1b$ evaporated in the fuel tank 1 may exceed the safety pressure of the fuel tank 1. The pressure exceeding the safety value functions as a pilot pressure to cause the solenoid valve 22 to assume the first position $22_1$ so that the gas $1b$ in the tank 1 flows out into the release path 20 and, then, flows through the branching point 44 into the buffer tank 46 for storage. Thus, gas $1b$ resulting from spontaneous evaporation of the fuel within the fuel tank 1 need not be thrown away into air.

By some suitable means (not shown), the ECU 11 determines whether the engine is operating or not. If the ECU 11 determines that the internal combustion engine is operating and, at the same time, the pressure gauge 48 detects the pressure in the buffer tank 46 which is produced by the presence of fuel gas in the tank 46, the ECU 11 switches the supply control solenoid valve 62 into the second position $62_2$. Then the fuel gas within the buffer tank 46 flows into the excess fuel gas supply path 60, is compressed by the compressor 66, flows into the fuel supply path 2, and is supplied to the fuel injector. Like this, excess fuel gas supplied to the buffer tank 46 from the fuel tank 1 and the surge tank 10 and stored in the buffer tank 46 is effectively used as the fuel.

If the pressure within the buffer tank 46 exceeds the safety pressure of the buffer tank 46, the ECU 11 closes the switch 38 (FIG. 2) to cause current to flow through the heater 32 to heat the catalyst layer 34. When the temperature sensor 42 determines that the catalyst layer 34 is heated to a temperature suitable for causing chemical reaction to decompose fuel gas into carbon dioxide and hot steam, the ECU 11 switches the release control valve 24 to the first position $24_1$ so that excess fuel gas stored in the buffer tank 46 to produce therein a pressure near to its withstanding pressure is coupled to the catalyst layer 34 and is decomposed into water vapor and carbon dioxide. Thus, the excess fuel gas is not released into air, but the decomposed water and carbon dioxide are released. Also, this arrangement can prevent the buffer tank 46 from being broken.

Pre-heating the burner catalyst layer 34 makes it sure that the chemical reaction take place without fail, and, therefore, no incomplete chemical reaction which would cause production of noxious materials, such as carbon monoxide, can be prevented. The pressure-corrected flow rate control valve 27 adjusts the flow rate of the excess fuel gas to be supplied to the burner catalyst layer 34 in response to the reaction rate of the fuel gas in the catalyst layer 34.

In the described system, when excess fuel gas is generated, it is stored in the buffer tank 46 and, when the pressure of the gas within the buffer tank 46 exceeds the safety pressure of the buffer tank 46, the gas is decomposed into steam and carbon dioxide by means of the catalyst layer 34. According to a modification of the system of FIG. 1, the buffer tank 46, the supply control valve 62, and the compressor 66 may be eliminated, and, instead, when evaporated fuel gas within the fuel tank 1 rises to a value lower then but close to the withstanding pressure of the fuel tank 1, or when the pressure of fuel gas within the surge tank 10 rises to a value lower than but close to the withstanding pressure of the surge tank 10, the release control valve 24 may be placed into the first position $24_1$ so as to couple the evaporated gas $1b$ within the fuel tank 1 or the gas within the surge tank 10 to the burner catalyst layer 34 for decomposition. In this case, it may be desirable for the catalyst layer 34 to be pre-heated before the release control valve 24 is placed in the first position $24_1$, but it is not a necessary condition.

In this modification, the solenoid valve 22 is not necessary, either. More specifically, when the pressure within the fuel tank 1 exceeds the safety value of the tank 1, the burner catalyst layer 34 is first heated and, then, the valve 24 is switched into the first position $24_1$.

In a still another modification, the buffer tank 46 and the supply control valve 62 may be removed. In such modification, when the pressure within the surge tank 10 exceeds the safety value, the catalyst layer 34 is heated and, then, the valve 24 is switched into the first position $24_1$.

In another modification, the compressor 66 may be removed.

Figure 3:
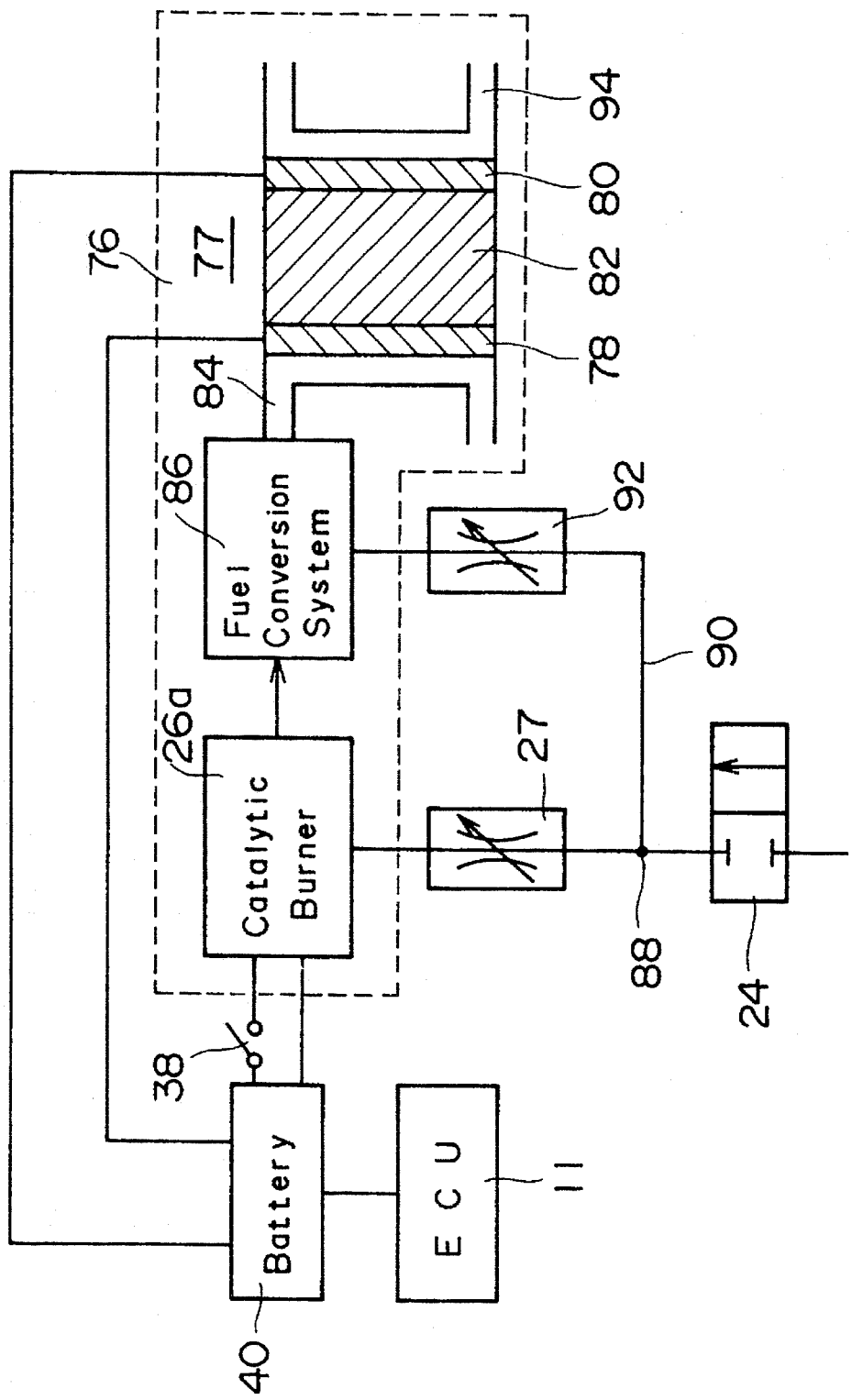
FIG. 3 shows a part of a liquefied gas fuel supply system according to a second embodiment of the present invention.

A liquefied gas fuel supply system according to a second embodiment of the present invention is described with reference to FIG. 3. The system according to the second invention is substantially the same as the system of the above-described first embodiment except that while the catalytic burner 26 is used in the first embodiment, the system of the second embodiment uses a fuel cell device 76. Accordingly, the same reference numerals used in FIGS. 1 and 2 are used-for the similar components in FIG. 3 and explanations about them are not made.

The fuel cell device 76 includes a body 77 of, for example, a phosphate type fuel cell. The fuel cell body 77 includes a fuel-side electrode 78, an air-side electrode 80, and an electrolyte layer 82 comprising, for example, a concentrated phosphoric acid aqueous solution used as an electrolyte, disposed between the two electrodes. Electrochemical reaction takes place when hydrogen and oxygen are supplied to the fuel-side electrode 78 and the air-side electrode 80, respectively, so that DC current is generated.

On the side of the fuel-side electrode 78, hydrogen is separated into hydrogen ions and electrons. The hydrogen ions and the electrons move to the air-side electrode 80 through the electrolyte layer 82 and an external circuit, for example, a battery 40, respectively. On the air-side electrode 82, oxygen in air supplied to the electrode 80 reacts with the hydrogen ions and the electrons which have moved from the fuel-side electrode 78 through the electrolyte layer 82 and the battery 40, respectively, to thereby produce water.

Generation of power means that current flows in the opposite direction to the flow of electrons. Thus, in the fuel cell device 76, current flows from the air-side electrode 80 through the battery 40 to the fuel-side electrode 78 as a result of chemical reaction, whereby the battery 40 is charged.

Hydrogen is supplied to the fuel-side electrode 78 through a hydrogen path 84. The hydrogen supplied to the electrode 78 is produced by means of a fuel conversion system 86. A branch path 90 extends from the junction point 88 between the pressure-corrected flow rate control valve 27 and the release control valve 24 to the fuel conversion system 86 for supplying excess fuel gas to the system 86. The branch path 90 includes a pressure-corrected flow rate control valve 92.

The fuel cell device 76 also includes a catalytic burner 26a, which is similar to the catalytic burner 26 used in the system of FIG. 1. Heated water vapor generated by a catalyst layer of the catalytic burner 26 is collected and supplied to the fuel conversion system 86. Catalytic reaction provided by a layer of catalyst, such as nickel, for example, included in the fuel conversion system 86 produces hydrogen gas supplied from the hot water vapor from catalytic burner 26a and fuel gas supplied through the pressure-corrected flow rate control valve 92. The produced hydrogen gas is supplied to the hydrogen path 84. Air is supplied to the air-side electrode 80 through an air path 94.

According to this embodiment, the battery 40 can be charged from the fuel cell device 76, which prevents self-discharge of the battery 40 even when the combustion engine is not operated for a long time, so that the engine is always ready for operation.

The system of the second embodiment is the same as that of the first embodiment except that the fuel cell device 76 is used in place of the catalytic burner 26. Accordingly, the various modifications which have been described with respect to the first embodiment can be also made to the system of the second embodiment.

A liquefied gas fuel supply system according to a third embodiment of the present invention is described with reference to FIG. 4. According to the first embodiment, the solenoid valve 22 is used to supply fuel gas spontaneously evaporated within the fuel tank 1 to the compressor 66 for compression and supply to the fuel supply path 2, and for storage in the buffer tank 46, and the supply control valve 62 is used to supply excess fuel gas in the buffer tank 46 to the compressor 66 for compression and supply to the fuel supply path 2. Different from the first embodiment, according to the third embodiment, excess fuel gas is only stored in the buffer tank 46 and is not supplied directly to the fuel supply path 2. In addition, fuel gas stored in the buffer tank 46 is not supplied to the fuel supply path 2, but it is re-liquefied and returned to the fuel tank 1.

The same reference numerals and symbols as used in FIG. 1 are attached to components and functions which are similar or equivalent to those used in the system shown in FIG. 1, and such components and functions are not described further.

Figure 4:
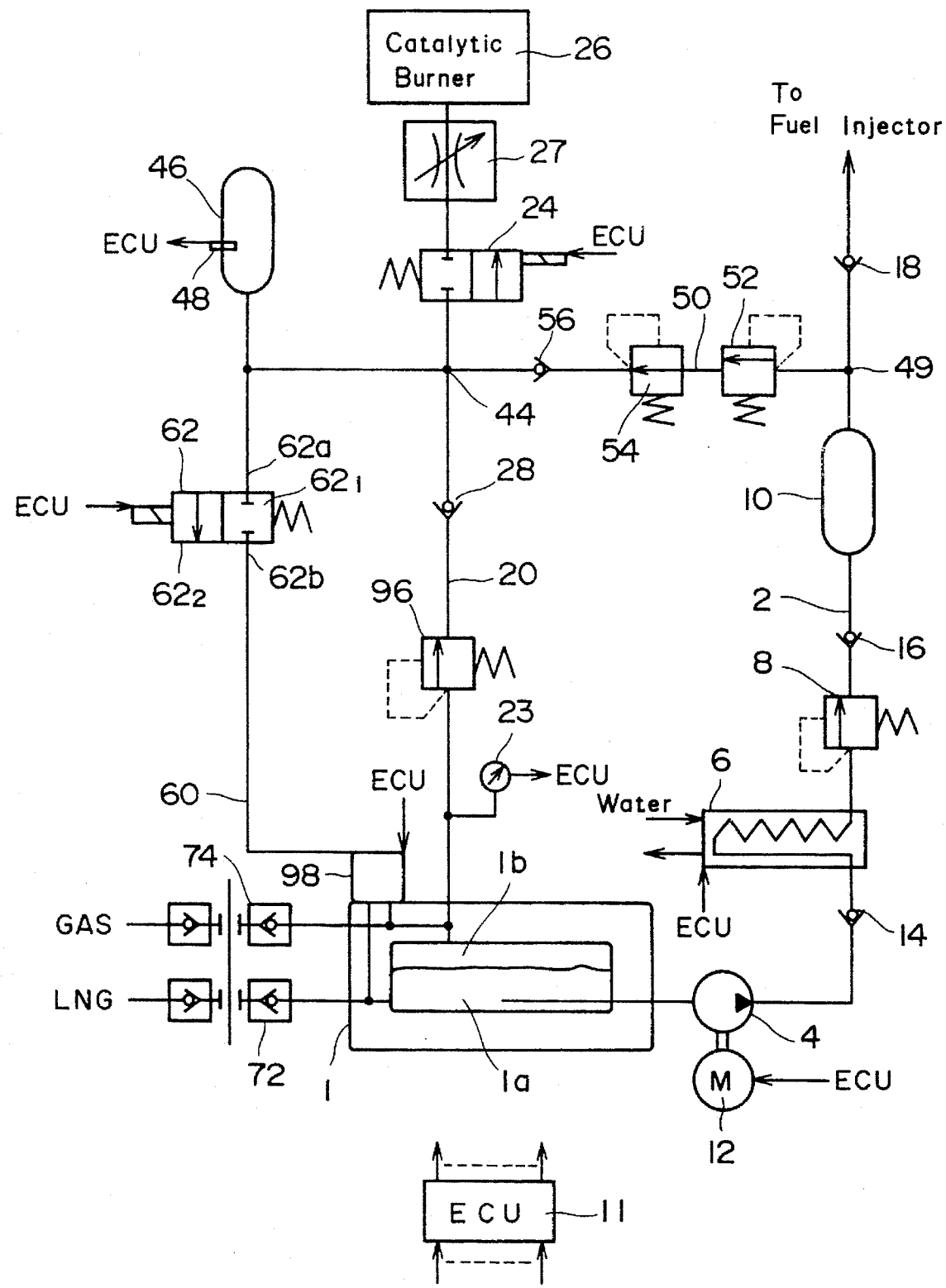
FIG. 4 is a circuit diagram showing a liquefied gas fuel supply system according to a third embodiment of the present invention.

In the system according to the third embodiment shown in FIG. 4, no components corresponding to the solenoid valve 22, the compressor 66, and their associated components are used. Instead, a pressure control valve, for example, a relief valve 96 is disposed between the fuel tank 1 and the check valve 28. The relief valve 96 is closed when the pressure in the fuel tank I is lower than the safety pressure, for example, 1.84 MPa, which is slightly lower than the withstanding pressure of the inner reservoir of the tank 1. When the pressure of the tank 1 exceed the safety pressure, the relief valve 96 is opened to transfer excess fuel gas 1b within the fuel tank 1 to the buffer tank 46 for storage therein.

Re-liquefying means, for example, a re-liquefying system 98 is associated with the fuel tank 1, which coupled to the second port 62b of the supply control valve 62. The supply control valve 62 assumes the second position $62_2$ when excess fuel gas is stored in the buffer tank 46, as in the first embodiment, and supplies excess fuel gas from the buffer tank 46 to the re-liquefying system 98.

The re-liquefying system 98 may be driven by the internal combustion engine to which the liquefied gas fuel supply system is supplying fuel, and includes, for example, excess fuel gas compressor for compressing excess fuel gas, and a cold box for cooling and condensing the gas as compressed in the gas compressor. Preferably, the cold box includes, for example, a coolant compressor, a condenser, a squeezer, and an evaporator, with nitrogen gas used as a coolant.

By the use of the re-liquefying system 98, excess fuel gas stored in the buffer tank 46 is liquefied and supplied back to the fuel tank 1. Thus, unused fuel gas can be used again as fuel.

In the system according to the third embodiment, too, for operating the internal combustion engine, the liquefied gas fuel 1a within the fuel tank 1 is vaporized by the vaporizer 6 and is supplied through the fuel supply path 2 to the fuel injector of the combustion engine. When the engine is operated at a relatively low rate so that the amount of fuel used decreases, the pressure within the surge tank 10 increases. When the pressure within the surge tank 10 increases the safety pressure, for example, 26 MPa, of the surge tank 10, which is lower than but close to the withstanding pressure of the surge tank 10, the relief valve 52 is opened so that gas within the surge tank 10 flows out into the communication path 50. Then, the gas is reduced in its pressure by the pressure reducing valve 54 and is, then, stored in the buffer tank 46.

For example, if the internal combustion engine has not been operated for a long time so that the pressure of the spontaneously evaporated gas fuel 1b within the fuel tank 1b exceeds the safety pressure of the fuel tank 1, the relief valve 96 is opened to make the gas 1b stored in the buffer tank 46.

When the pressure gauge 48 detects the presence of gas within the buffer tank 46 during the operation of the internal combustion engine, the supply control valve 62 is placed in the second position $62_2$, which causes the gas within the buffer tank 46 to be supplied to the re-liquefying system 98. The re-liquefying system 98 liquefies the gas supplied thereto and supplies the liquefied gas to the fuel tank 1.

When the pressure of the gas stored within the buffer tank 46 exceeds the safety pressure of the tank 46, the catalyst layer 34 of the catalytic burner 46 is heated, as in the system of the first embodiment, and when the catalyst layer 34 is sufficiently heated, the release control valve 24 assumes the first position 24₁, which causes fuel gas within the buffer tank 46 and fuel gas within the fuel tank 1 are supplied to the catalytic burner 26 for decomposition into hot steam and carbon dioxide. The steam and carbon dioxide are released into air.

In the system of the third embodiment, too, the fuel cell device 76 can be used in place of the catalytic burner 26, as in the second embodiment.

In a modification of the third embodiment, the catalytic burner 26 and the release control valve 24 may be removed from the system of the third embodiment.

In the described embodiments, the relief valve 8 is disposed between the vaporizer 6 and the check valve 16, but it may be disposed between the branching point 49 and the check valve 18.

What is claimed is:

1. A liquefied gas fuel supply system comprising:

a fuel tank in which a liquefied gas fuel is stored;

fuel supplying means for vaporizing said liquefied gas fuel for supply to an internal combustion engine;

a release path for releasing outside said fuel tank, evaporated gas fuel resulting from evaporation of said liquefied gas fuel within said fuel tank;

catalytic decomposing means disposed in said release path for chemically decomposing said evaporated gas fuel;

release control means disposed in said release path between said decomposing means and said fuel tank, said release control means selectively assuming a coupling state for causing said decomposing means to communicate with said fuel tank, and a decoupling state in which said decomposing means is decoupled from said fuel tank.

2. The liquefied gas fuel supply system according to claim 1 wherein said system further comprises:

switching means disposed between said release control means and said fuel tank, said switching means being switchable between a first coupling state for causing said release control means to communicate with said fuel tank, and a decoupling state in which said release control means is decoupled from said fuel tank, said switching means being placed in said first coupling state when the pressure within said fuel tank is close to the withstanding pressure of said fuel task;

a buffer tank disposed between said switching means and said release control means; and supply control means disposed between said buffer tank and said fuel supplying means, said supply control means selectively assuming a coupling state for causing said buffer tank to communicate with said fuel supplying means, and a decoupling state in which said buffer tank is decoupled from said fuel supplying means, said supply control means assuming said coupling state when said internal combustion engine is operating and, at the same time, fuel gas is present in said buffer tank.

3. The liquefied gas fuel supply system according to claim 2 wherein said release control means assumes its coupling state when the pressure of fuel gas in said buffer tank reaches a value close to the withstanding pressure of said buffer tank.

4. The liquefied gas fuel supply system according to claim 2 wherein said switching means further has a second coupling state for causing said fuel supplying means to communicate with said fuel tank, said switching means assuming said second coupling state when the pressure of evaporated fuel gas within said fuel tank reaches a value close to the bottling pressure of said fuel tank.

5. The liquefied gas fuel supply system according to claim 2 wherein said fuel supply means includes a surge tank, and said liquefied gas fuel supply means further comprises communication means disposed between the outlet of said surge tank and said buffer tank, for causing said surge tank to communicate with said buffer tank when the pressure within said surge tank reaches a value close to the withstanding pressure of said surge tank.

6. The liquefied gas fuel supply system according to claim 1 wherein said decomposing means includes a catalyst layer which decomposes fuel gas supplied thereto into carbon dioxide and water vapor.

7. The liquefied gas fuel supply system according to claim 1 wherein said decomposing means includes means for producing hydrogen from gas fuel supplied thereto and supplying the produced hydrogen to a fuel cell as a fuel therefor.

8. The liquefied gas fuel supply system according to claim 1, further comprising:

pressure control means disposed between said release control means and said fuel tank for coupling evaporated fuel gas in said fuel tank to said release control means when the pressure within said fuel tank reaches a value close to the withstanding pressure of said fuel tank;

a buffer tank disposed between said pressure control means and said release control means; and re-liquefying means disposed between said buffer tank and said fuel tank for liquefying fuel gas in said buffer tank and supplying the liquefied gas to said fuel tank.

9. The liquefied gas fuel supply system according to claim 8, further comprising:

supply control means disposed between said buffer tank and said re-liquefying means, said supply control means selectively assuming a coupling state for causing said buffer tank to communicate with said re-liquefying means, and a decoupling state for decoupling said buffer tank from said re-liquefying means, said supply control means assuming said coupling state when fuel gas is present within said buffer tank.

10. The liquefied gas fuel supply system according to claim 8 wherein said fuel supplying means includes a surge tank, and said liquefied gas fuel supply means further comprises communication means disposed between the outlet of said surge tank and said buffer tank, for causing said surge tank to communicate with said buffer tank when the pressure within said surge tank reaches a value close to the withstanding pressure of said surge tank.

11. A liquefied gas fuel supply system comprising:

a fuel tank in which a liquefied gas fuel is stored;

fuel supplying means for vaporizing said liquefied gas fuel for supply to an internal combustion engine;

a release path for releasing outside said fuel tank, evaporated gas fuel resulting from evaporation of said liquefied gas fuel within said fuel tank;

catalytic decomposing means in said release path for chemically decomposing gas evaporated from the liquefied gas fuel within said fuel tank; and switching means switchable between a first state for supplying evaporated gas to said decomposing means and a second state for supplying evaporated fuel gas to said fuel supplying means, said switching means being switched to said second state when the pressure within said fuel tank exceeds a first pressure related to a maximum bottling pressure of said fuel tank, and switched to said first state when the pressure within said fuel tank exceeds a second pressure higher than said first pressure, said second pressure being related to the withstanding pressure of said fuel tank.

12. The liquefied gas fuel supply system according to claim 11 wherein said fuel supplying means includes a surge tank, and said system further comprises a pressure control valve disposed between said surge tank and said decomposing means for coupling fuel gas in said surge tank to said decomposing means when the pressure within said surge tank exceeds a pressure related to the withstanding pressure of said surge tank.

13. A liquefied gas fuel supply system comprising:

a fuel tank in which a liquefied gas fuel is stored;

fuel supplying means for vaporizing said liquefied gas fuel for supply to an internal combustion engine, the fuel supplying means including a surge tank;

a buffer tank;

a pressure control valve for coupling gas evaporated from said liquefied fuel gas within said fuel tank to said buffer tank when the pressure of the evaporated fuel gas exceeds a value related to the withstanding pressure of said fuel tank;

re-liquefying means disposed between said buffer tank and said fuel tank for re-liquefying fuel gas within said buffer tank and supplying the re-liquefied gas to said fuel tank; and a pressure control valve disposed between said surge tank and said buffer tank for coupling fuel gas in said surge tank to said buffer tank when the pressure within said surge tank exceeds a pressure related to the withstanding pressure of said surge tank.

* * * * *